March 18, 1958     K. B. RIS     2,827,267

GAS STRIPPING APPARATUS

Filed Sept. 17, 1954     2 Sheets-Sheet 1

INVENTOR.
Kenneth B. Ris
BY
Frease & Bishop
ATTORNEYS

March 18, 1958  K. B. RIS  2,827,267
GAS STRIPPING APPARATUS
Filed Sept. 17, 1954  2 Sheets-Sheet 2

INVENTOR.
Kenneth B. Ris
BY Frease & Bishop
ATTORNEYS

United States Patent Office 2,827,267
Patented Mar. 18, 1958

2,827,267

GAS STRIPPING APPARATUS

Kenneth B. Ris, Massillon, Ohio, assignor to The Griscom-Russell Company, Massillon, Ohio, a corporation of Delaware Application September 17, 1954, Serial No. 456,736

5 Claims. (Cl. 257—231)

The invention relates to apparatus and methods for stripping gases from liquids. More particularly the invention relates to heat exchanger apparatus for substantially instantaneously stripping gases or vapors absorbed or otherwise contained in liquids to separate such gases from the liquids, and to improved methods by which such a stripping operation may be carried out.

Many industrial processes involve an operation commonly called "stripping" by which vapors are separated from liquids by heating the vapor-containing liquid to release the vapors from the liquid. An example of the use of the stripping procedure is in the preparation of natural gas for introduction into pipe lines. Raw gas as it comes from a gas well may contain components, such as $H_2O$, $CO_2$ and $H_2S$, which undesirable gases should be removed before the natural gas enters pipe lines. In other words, the raw natural gas should be cleaned so that dry, sweet gas is supplied to distribution pipe lines. Similarly, such undesirable components as water vapor and acid gases (carbon dioxide and hydrogen sulphide) must be removed from petroleum refining residue gas before further use of such residue gas.

In both instances, a treating procedure has been used in which the acid gases and water vapor are removed from the natural or residue gas by absorption in suitable mechanical agents and/or solvents. Such solvents may be triethanolamine, diethanolamine, monoethanolamine, triethylene glycol, diethylene glycol and ethylene glycol. The first three are organic bases which form weak chemical combinations with acid gases at certain conditions of relatively low temperature and high pressure, which combinations are broken at higher temperatures and/or lower pressures. The last three are hygroscopic agents whose capacity to absorb water vapor varies in similar fashion with temperature and pressure conditions. Since such solvents are relatively expensive, it is desired to strip the absorbed gases therefrom and to recycle the solvent to the absorption equipment. The stripping operation is carried out by heating the enriched or contaminated solvent to release and remove the contained water vapor and acid gases.

Heretofore the stripping operation has been carried out in equipment involving two units, namely, a reboiler and a distillation column or stripping tower. Heat is applied to the enriched solvent in a kettle type reboiler to vaporize the water and acid gases, and the vaporized water and acid gases are released by bubbling through the heated solvent in the low pressure distillation column.

The operation of such prior stripping equipment involves a number of disadvantages or difficulties. First of all, two pieces of equipment are required for conventional reboiler and stripper apparatus. Next, relatively high operating temperatures in the stripping equipment may result in higher operating temperatures in the absorption equipment which reduce the amount of vapor that can be absorbed by the solvent, thus requiring a larger amount of solvent in the entire cycling system. This not only increases the amount and cost of expensive solvent used but also the cost of larger-sized equipment for handling and circulating the larger volume of solvent.

Next, the corrosive character of the contaminating gases causes considerable damage by corrosion to the reboilers and distillation columns, requiring frequent shutdowns for repairs, replacement and cleaning. Another corrosion-erosion problem arises from the vibration from ebullition in the conventional reboiler, which has caused severe damage in many instances.

Accordingly, it is a general object of the present invention to provide a new heat exchanger stripper apparatus, which eliminates the two-unit conventional reboiler and separate distillation column, and enables the reboiling and stripping operations to be carried out at one time in a single vertical unit.

It is a further object of the present invention to provide a new heat exchanger stripper apparatus in which the stripping process in a glycol amine treatment plant may be carried out at a lower temperature or higher pressure, or the most advantageous combination of temperature and pressure, whereby with lower temperatures in the stripper equipment, correspondingly lower temperatures may be used in the absorption equipment and the solvent in the absorption equipment may absorb more vapors to be stripped, thus permitting a reduced amount of solvent in the cycling system of given capacity.

Furthermore, it is an object of the present invention to provide a new heat exchanger stripper apparatus in which the undesired gases to be stripped from a solvent containing the same are released substantially instantaneously at relatively low temperature from the solvent without bubbling the released vapors through a liquid body of the solvent as is the case in the use of conventional reboilers and distillation columns.

Furthermore, it is an object of the present invention to provide a new heat exchanger stripper apparatus which releases undesired vapors from a solvent containing the same substantially instantaneously from a thin heated solvent film, thereby eliminating corrosion-erosion problems incident to vibration from ebullition and the severe damage heretofore caused thereby in conventional horizontal kettle type reboilers.

Also, it is an object of the present invention to provide a new heat exchanger stripper apparatus which minimizes damage by corrosion or wear of heat exchanger tubes supplying the heat for stripping at the support plates for the tubes and other locations in the equipment.

Furthermore, it is an object of the present invention to provide a new heat exchanger stripper apparatus by which heat is supplied to a thin solvent film in the apparatus for substantially instantaneous stripping of the contaminating gases therefrom so that such gases substantially immediately flash off from the solvent.

Moreover, it is an object of the present invention to provide a new heat exchanger stripper apparatus in which the contaminating-gas-containing solvent is caused to flow in a thin film down along heat transfer surfaces so that the solvent is heated and the vapor released from the liquid film substantially instantaneously.

Also, it is an object of the present invention to provide a new heat exchanger stripper apparatus having vertical heat exchanger tubes provided with longitudinally extending radial fins or flutes on which tubes and fins or flutes the contaminating-gas-containing solvent or liquid is uniformly distributed to flow thin films thereof downwardly along the tubes and fins or flutes where the gases or vapors can readily and quickly escape not only from the heated heat exchanger surfaces, but from the liquid solvent containing the same upon heating of the liquid solvent, thereby minimizing corrosion damage to the equipment resulting from the corrosive components of the vapors released from the solvent.

Furthermore, it is an object of the present invention to provide a new method of stripping gases from a liquid by which the gases are substantially instantaneously released in vapor form from the liquid as heated without bubbling through a body of heated liquid.

Furthermore, it is an object of the present invention to provide a new method of stripping gases or vapors from liquids by flowing gas-containing liquid in a thin film along a heated heat transfer surface so that the liquid is heated and the vapor released from the liquid film substantially instantaneously.

Finally, it is an object of the present invention to solve the problems stated, to eliminate difficulties heretofore encountered in stripping gases from liquids in conventional reboilers and distillation columns, to generally improve gas stripping apparatus and procedures, and to obtain the foregoing advantages and desiderata in an effective and simple manner.

These and other objects and advantages, apparent to those skilled in the art from the following description and claims, may be obtained, the stated results achieved, and the described difficulties overcome by the apparatus, methods, steps, operations and procedures which comprise the present invention, the nature of which are set forth in the following general statements, a preferred embodiment of which—illustrative of the best mode in which applicant has contemplated applying the principles—is set forth in the following description and shown in the drawings, and which are particularly and distinctly pointed out and set forth in the appended claims forming part hereof.

The nature of the discoveries and improvements in gas stripping apparatus of the present invention may be stated in general terms as preferably including in a heat exchanger, vertical heat exchanger tubes preferably provided with longitudinally extending radial fins or flutes, means for interiorly heating the tubes, means for discharging gas-containing liquid to the upper ends of the exterior surfaces of the tubes and fins, means for uniformly distributing the discharged liquid onto the tube and fin surfaces to cause the liquid to flow in a thin film downward along the tube and fin surfaces while being heated thereby, means for collecting the stripped liquid, and means for collecting the gases stripped from the liquid.

The nature of the discoveries and improvements in gas stripping methods of the present invention may be stated in general terms as preferably including the steps of flowing gas-containing liquid onto heat exchange surfaces, substantially uniformly distributing said liquid on the surfaces as flowed thereon, flowing the liquid in a thin film along the surfaces, heating the thin liquid film as it flows along the surfaces, permitting gases contained in the liquid vaporized by such heating to escape from the thin liquid film and heated surfaces substantially instantaneously, collecting the gas-free liquid, and separately collecting the gas stripped therefrom.

By way of example, the improved apparatus of the present invention is shown in the accompanying drawings forming part hereof, wherein.

Similar numerals refer to similar parts throughout the various figures of the drawings.

Figures 1, 5, 6, 7, 8, 9:
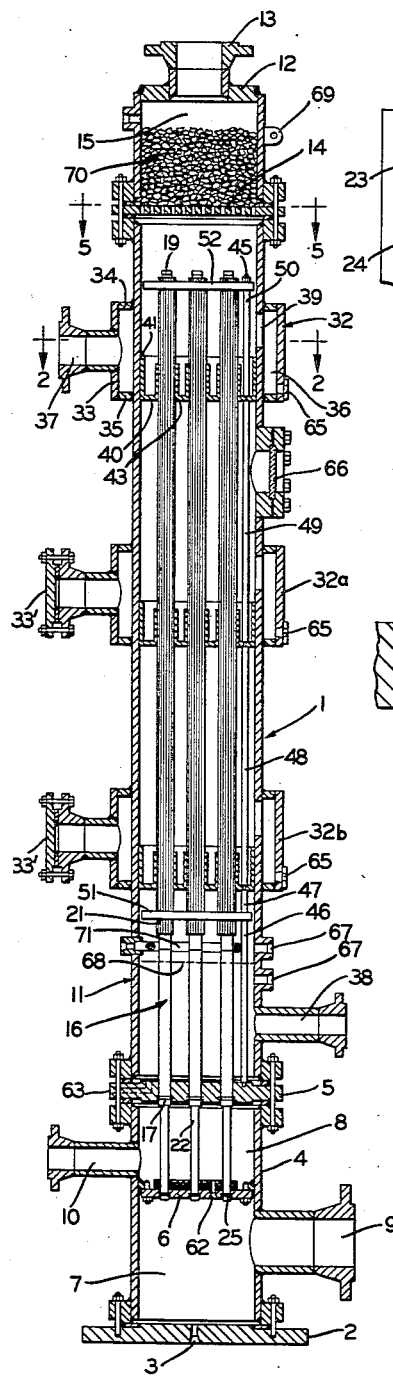
Figure 1 is a longitudinal section through the improved gas stripping heat exchanger apparatus.
Fig. 5 is a section looking in the direction of the arrows 5—5, Fig. 1.
Fig. 6 is an enlarged fragmentary sectional view of the upper end of one of the heat exchanger tubes illustrated in Figs. 1, 2 and 3.
Fig. 7 is an enlarged fragmentary sectional view of the end portion of one of the heat exchanger tubes.
Fig. 8 is a fragmentary sectional view of the lower end of the inner tube of one of the heat exchanger tubes.
Fig. 9 is an enlarged fragmentary sectional view of certain of the parts shown in Fig. 1.

The improved apparatus and method are described herein with particular reference to stripping gases from a solvent in a glycol amine treatment plant for the treatment of natural gas before being introduced into distribution pipe lines, but it is to be understood that the improved apparatus and method also may be used for many other industrial processes where gases are to be stripped from liquids.

The improved apparatus is indicated generally at 1 and is essentially a heat exchanger having a stationary head cover plate 2 provided with a plugged drain opening 3, and the plate 2 may form the base of the unit extending vertically upward therefrom. A stationary head barrel 4 is mounted on the plate 2, the upper end of which is closed by the stationary tube sheet 5. An inner-tube tube sheet 6 is mounted within the barrel 4 intermediate the ends thereof dividing the barrel into a tube inlet compartment 7 and a tube outlet compartment 8, and the barrel 4 is provided with an inlet connection 9 communicating with the head inlet compartment 7 and an outlet 10 communicating with the head outlet compartment 8.

A shell generally indicated at 11 is connected to, and extends vertically upwardly from, the tube sheet 5, and the shell 11 is closed at its upper end by a shell cover plate 12 provided with a vapor outlet connection 13. The upper end of the shell 11 is preferably provided with a perforated partition wall plate 14 spaced from the shell cover 12 and forming therewith a vapor collecting compartment 15.

A tube bundle including a plurality of tubes generally indicated at 16 extends vertically upward within the shell 11. The lower end of each tube 16 (Fig. 7) is expanded in a usual manner with a preferably double groove tube joint in an opening in the stationary tube sheet 5, as indicated at 17, and an expanded ferrule 18 may be located within the end of each tube 16 at the tube sheet joint. The upper end of each tube 16 is closed by an end plug 19 (Fig. 6) and longitudinally extending fins 20 project radially from the outer surface of each tube 16 from the upper end of each tube 16 downward for the greater portion of the length of the tube 16, to a location indicated at 21 in Fig. 1. The tubes 16 are free of fins from the location 21 downward to the stationary tube sheet 5.

An inner tube 22, open at its upper end, extends upward within each tube 16. The tubes 22 have a smaller outer diameter than the inner diameter of the tubes 16 and the upper end of each tube 22 (Fig. 6) is maintained in proper concentric relation within the tube 16 by guide vanes 23 and 24, which also assist in guiding the inner tubes 22 in proper position when being inserted in tubes 16 upon assembly of the equipment. The lower ends of each inner tube 22 (Fig. 8) are expanded in openings in the inner-tube tube sheet 6, as indicated at 25, an expanded ferrule 26 being provided for each inner-tube sheet joint 25.

Referring to Fig. 9, the inner-tube tube sheet 6 may be mounted within the head barrel 4 by bolts 27, the upper ends of which may be welded to a support ring 28 welded at 29 within the head barrel 4. A series of guide plates 30 provided with apertures through which the tubes 22 extend are bolted to the upper surface of the inner-tube sheet 6 at 31. These guide plates 30 are used only for assembly purposes by sliding the same along the tubes 22 as the tubes 22 are inserted within the tubes 16 to hold the tubes 22 in proper position for such insertion. The guide plates 30 may also be used in the reverse manner when the unit 1 is disassembled for repairs, to maintain the tubes 22 properly spaced when withdrawn from the tubes 16.

Figure 2:
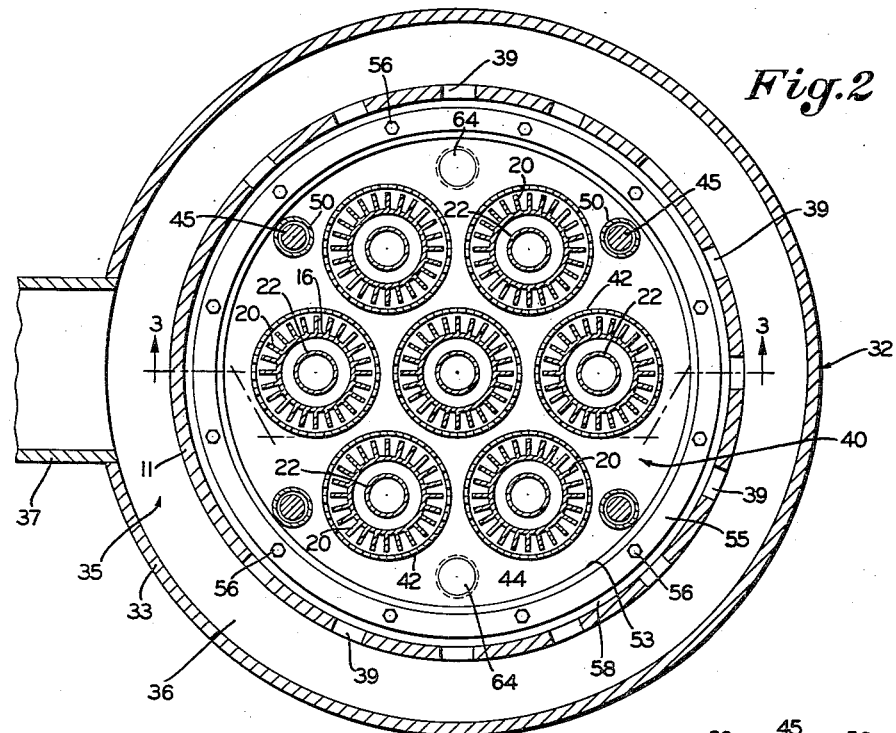
Fig. 2 is an enlarged section looking in the direction of the arrows 2—2, Fig. 1.
Figure 3:
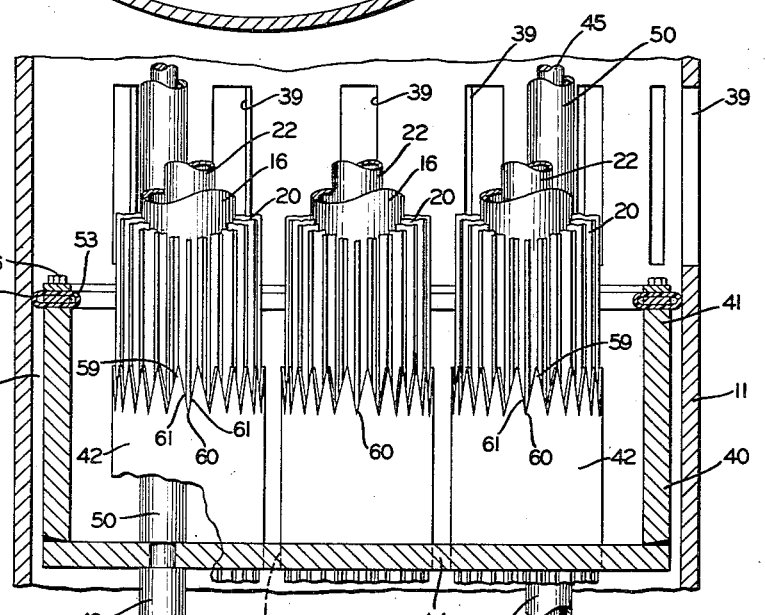
Fig. 3 is a fragmentary sectional view taken on the line 3—3, Fig. 2.

A distribution band, or manifold, generally indicated at 32, surrounds the shell 11 adjacent the upper ends of the tubes 16 as shown in Figs. 1, 2 and 3. Similar distribution manifolds 32a and 32b having the same construction as the distribution manifold 32 surround the shell 11 at spaced intervals below the distribution band 32, as shown in Fig. 1. Normally the manifolds 32a and 32b are closed off by blind flanges 33' and are out of service. However, the additional manifolds 32a and 32b are provided to adapt the equipment for use in stripping various types of gases from various types of liquids and also to adapt the equipment for use with operations where substantial changes in the volume of liquid being treated may occur. Normally, one manifold only will be used and the particular one adapted for the particular conditions selected. However, under certain circumstances, it is possible that two or more of the manifolds 32, 32a or 32b may be in service at the same time.

Since the construction and use of each distribution manifold 32, 32a and 32b is the same, only the manifold 32 will be described in detail.

The manifold 32 is formed by an outer annular wall 33 surrounding and spaced from the shell 11, and upper and lower ring walls 34 and 35 preferably are welded to the walls 11 and 33 to form an annular distribution chamber 36 surrounding the shell 11. A shell inlet connection 37 communicates through the wall 33 with the distribution chamber 36. A shell outlet connection 38 is provided near the lower end of the shell 11 above the stationary tube sheet 5. The shell 11 (Figs. 2 and 3) is provided with a series of preferably elongated vertically extending apertures 39 at circumferentially spaced locations communicating with the upper annular portion of the distribution chamber 36 (Fig. 1). These apertures 39 are preferably equally spaced throughout the greater portion of the periphery of the shell as shown in Fig. 2, but no apertures are provided immediately opposite or adjacent the shell inlet connection 37, as shown.

A cup-shaped tray 40 is mounted within the shell 11 with its upper open end 41 located below the lower ends of the apertures 39 (Fig. 3) and the tray 40 is provided with a series of preferably cylindrical collars 42 extending upward from openings 43 in the tray bottom wall 44 through which openings the tubes 16 and fins 20 thereon extend. Each collar 42 is preferably slightly larger in diameter, as shown in Fig. 2, than a circle circumscribing the outer edges of the fins 20 on tubes 16 so as to provide clearance between the outer edges of the fins 20 and the inner surfaces of the collars 42.

Tie rods 45 (Figs. 1, 2 and 3) extend upward from the stationary tube sheet 5 to a location adjacent the upper closed ends of the tubes 16, and the tie rods are each surrounded with a series of spacer sleeves 46, 47, 48, 49 and 50. A lower tube support ring 51 is mounted on the tie rods 45 and held in position between spacer sleeves 46 and 47; the tray of distribution manifold 32b is mounted in position between spacer sleeves 47 and 48; the tray of distribution manifold 32a is mounted in position between spacer sleeves 48 and 49, and the tray 40 of distribution manifold 32 is mounted in position between spacer sleeves 49 and 50. An upper tube support ring 52 is mounted on the upper ends of spacer sleeves 50, and the upper ends of tie rods 45 are tensioned against tube support ring 52, thus holding the indicated parts in assembled positions as described.

Clearance is provided between the outer peripheries of tube support rings 51 and 52 and the inner surfaces of shell 11 to permit relative movement therebetween. The tube support rings 51 and 52 are each provided with apertures, not shown, through which the finned portion of tubes 16 extend.

Figure 4:
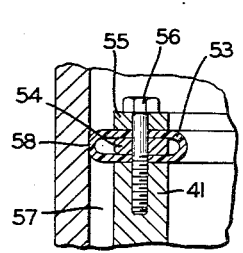
Fig. 4 is a further fragmentary sectional view of certain of the parts shown in Fig. 3.

Temperature changes and temperature differentials may result in differential longitudinal expansion of the shell member 11 and of tie rods 45 resulting in relative movement between the trays 40 and the shell 11 and between the trays 40, the tube support rings 51 and 52 and the tubes 16. Such relative movement is accommodated by the clearance between the tubes 16 and collars 42 on trays 40 and between the tubes 16 and the holes in support rings 51 and 52; and relative movement between the trays 40 and shell 11 is accommodated by the arrangement illustrated in Figs. 3 and 4.

A tubular ring 53 of anti-friction flexible sealing material, such as Teflon, is mounted on the upper annular edge 41 of each tray member 40 by split internal clamping rings 54 and an outer clamping ring 55 bolted at 56 to the tray member rim 41. Although there is clearance indicated at 57 between the side walls of the tray member 40 and the inner surface of shell 11, the outer annular surface 58 of sealing ring 53 provides a movable gasket seal between each tray 40 and the shell 11 permitting relative movement therebetween.

In accordance with the present invention, the upper edge of each collar 42 in each tray 40 is provided with a saw-tooth-like formation with upper points 59 and pointed valleys 60 therebetween. Thus, upwardly angled edges 61 extend upward and outward in a V-shaped manner from each valley 60 to the two adjacent points 59. The valleys 60 and edges 61 form a V-shaped weir, and one of these V-shaped weirs 60—61 is located radially opposite each fin 20 of each tube 16, with the pointed valley 60 in alignment with the center line of the fin 20 and with the pointed ridges 59 in radial alignment with the centers of the spaces between any fin and the next adjacent fin on either side.

The inner-tube tube sheet 6 is provided with a suitable plugged drain 62, the stationary tube sheet 5 with a suitable plugged drain 63, the trays 40 with suitable plugged drains 64 (Fig. 2), and each manifold with suitable plugged drains 65 for draining the unit 1 when required; and a sight glass 66 may be mounted on the shell 11 for inspecting the surfaces of the tubes 16 when the unit is in operation. Suitable connections 67 also may be provided in the shell 11 for a liquid level gauge to ascertain the level of the liquid in the shell, indicated at 68 in Fig. 1. Also, the shell 11 may be provided with a lifting lug 69 for use in assembling, lifting or locating the unit 1.

In operation the gas stripper unit may be connected with suitable piping, pumps, etc. with an absorber tower in a glycol amine treatment plant. Steam is supplied to tube inlet 9 entering head inlet compartment 7 and passing upward through inner tubes 22 to the open upper ends thereof and then down around the tubes 22 within tubes 16 to head outlet compartment 8 where condensate collects and is discharged from the unit 1 through tube outlet 10. Thus, heat is supplied to the tubes 16 and the fins 20 thereof.

The solvent liquid containing contaminating gases such as $H_2O$, $CO_2$ and $H_2S$ to be stripped therefrom flows from the absorber tower into the shell inlet 37 and into distribution compartment 36. The solvent liquid then flows through apertures 39 and into tray 40, substantially even distribution of the solvent liquid into the tray 40 being provided by the spacing of the apertures 39 shown in Fig. 2, relative to the shell inlet 37.

The solvent liquid then fills up in tray 40 to a liquid level substantially level with the points 59 of the saw-tooth upper edges of sleeves 42 and spills over or flows over the V-weir notches 60—61. The shape of the V-weir notches 60 and 61 is such that the liquid overflows in thin sheets or streams from all edges 61 against the opposite surfaces of the adjacent tube fins 20, thereby supplying each tube fin 20 with a thin film of liquid on both surfaces thereof, with substantially uniform distribution to all fins 20 and tubes 16. The liquid then flows down the surfaces of the tubes 16 and fins 20 by gravity in a thin, evenly distributed film throughout, and finally collects in the bottom of the shell above the stationary tube sheet 5, the liquid level 68 being maintained by valving connected with the shell outlet 38 through which the liquid collected in the shell is cycled back to the absorption tower.

The absorbed gases in the gas-containing liquid introduced into shell inlet 37 vaporize substantially instantaneously from the thin liquid film flowing down the outer surfaces of tubes 16 and fins 20 as the liquid film is heated by the heat supplied internally to the tubes 16. The vaporized gases can thus escape quickly from the liquid by film evaporation and at the same time the gases escape from the heated surfaces of the finned tubes 16.

The vaporized gases pass upward within the shell 11 through the spaces between fins 20 and through perforated baffle plate 14 into vapor-collecting compartment 15 from whence the contaminating gases may be discharged through vapor outlet 13.

A sparger-pipe 71 may, if desired, be located within the shell 11 above the liquid level 68, through which low pressure steam is introduced into the shell to aid in the stripping action. The steam reduces the partial pressure of the acid gas being stripped from the thin film formed on the fins.

In event that any of the solvent liquid is entrained and passes upward as solvent droplets with the vaporized contaminating gases, the droplets of solvent will impinge the surfaces of tower packing material 70 which may be provided in compartment 15 above baffle plate 14 and coalesce and run through baffle plate 14 back into the portion of the shell 11 above tray 40.

In this manner, substantially even distribution of the gas-containing liquid is obtained in supplying the same to the heated surfaces of the heat exchanger tubes 16 as a thin uniform liquid film, and the gases escape almost instantaneously from the solvent liquid film when heated. This prevents any substantial or continued contact of the corrosive gases with heated metal surfaces, thereby reducing corrosion to a minimum.

Moreover, since the vaporized gases stripped from the liquid solvent do not bubble through a body of liquid, there is no vibration of ebullition set up in operation of the equipment which has caused severe damage in many conventional horizontal reboilers.

Because of the immediate release of the vapor from the heat transfer surface, it is possible to operate the entire stripping plant at a lower temperature or at higher pressure, or the most advantageous combination of both. If the stripping plant can be operated at a lower temperature than with conventional equipment, the solvent liquid can absorb more gases in the absorption tower, thus reducing the amount of solvent cycled through the absorption tower and stripper unit 1.

In addition to the advantages indicated, the film type stripping procedure described is carried out in a single piece of equipment in place of the conventional two-unit kettle type reboiler and distillation column.

Accordingly, the apparatus and methods of the present invention provide for furnishing to the liquid to be stripped in the heat exchanger stripping unit 1, the heat required for stripping instantaneously; provide for flowing the liquid to be stripped uniformly in thin films along heat transfer surfaces so that the liquid is heated and the vapor released from the liquid film from which it can readily escape; provide for eliminating the corrosion difficulties heretofore experienced in the use of conventional reboilers and distillation columns; accomplish the many new functions hereinabove described; and overcome the many prior art difficulties and solve long-standing problems in the art.

In the foregoing description, certain terms have been used for brevity, clearness and understanding; but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example and the scope of the present invention is not limited to the exact details illustrated, or to the specific unit shown, or to the uses described since the improved apparatus and method have many industrial applications.

Having now described the features, discoveries and principles of the invention, the operation and procedure of preferred method steps thereof, the construction and operation of the improved apparatus, and the advantageous, new and useful results obtained thereby; the new and useful apparatus, methods, steps, operations, procedures, discoveries, principles, elements, combinations, and sub-combinations, and mechanical equivalents obvious to those skilled in the art, are set forth in the appended claims.

I claim:

1. Gas stripping apparatus including a vertical heat exchanger shell, a tube sheet at one end of the shell, a head member connected to the tube sheet, vertically arranged heat exchanger tubes connected with the tube sheet and extending upwardly in the shell, each tube having a series of longitudinally extending radially projecting spaced fins mounted on an outer surface thereof, said fins having spaced outer edges, means for circulating a heating medium through the head member and the interior of the tubes, tray means within the shell surrounding upper portions of the tubes intermediate the ends of the fins, shell inlet means communicating with said tray means, a shell outlet communicating with the shell adjacent the lower ends of said tubes, a vapor outlet communicating with the shell at the upper ends of said tubes, weir means on the tray means surrounding each of the tubes and fins, said weir means having liquid directing portions radially aligned with each of the fin outer edges of each of the tubes for flowing liquids supplied to the tray means through said shell inlet means substantially uniformly onto the outer edges and surfaces of the fins with said weir means constituting the sole means for flowing liquid to said fins and tubes, and gases released from the liquids being free of radial restriction by the fins; whereby as the liquid film flows downwardly along the outer surfaces of the fins and tubes to the shell outlet, gases absorbed therein are vaporized and released from the liquid film, and the vapor passes upward through the shell to the vapor outlet.

2. Gas stripping apparatus including a vertical heat exchanger shell, a tube sheet at one end of the shell, a head member connected to the tube sheet, vertically arranged heat exchanger tubes connected with the tube sheet and extending upwardly in the shell, each tube having a series of longitudinally extending radially projecting spaced fins mounted on an outer surface thereof, said fins having spaced outer edges, means for circulating a heating medium through the head member and the interior of the tubes, tray means within the shell surrounding upper portions of the tubes intermediate the ends of the fins, the tray means including an upstanding collar member surrounding each tube spaced from the fin outer edges and extending axially of said tube, shell inlet means communicating with said tray means, a shell outlet communicating with the shell adjacent the lower ends of said tubes, a vapor outlet communicating with the shell at the upper ends of said tubes, weir means formed in each of the collar members having liquid directing portions radially aligned with each of the fin outer edges for flowing liquids supplied to the tray means through said shell inlet means substantially uniformly onto the outer edges and surfaces of the fins with said weir means constituting the sole means for flowing liquids to said fins and tubes, and gases released from the liquids being free of radial restriction by the fins; whereby as the liquid film flows downwardly along the outer surfaces of the fins and tubes to the shell outlet, gases absorbed therein are vaporized and released from the liquid film, and the vapor passes upward through the shell to the vapor outlet.

3. Gas stripping apparatus including a vertical heat exchanger shell, a tube sheet at one end of the shell, a head member connected to the tube sheet, vertically arranged heat exchanger tubes connected with the tube sheet and extending upwardly in the shell, each tube having a series of longitudinally extending radially projecting spaced fins mounted on an outer surface thereof, said fins having spaced outer edges, means for circulating a heating medium through the head member and the interior of the tubes, tray means within the shell surrounding upper portions of the tubes intermediate the ends of the fins, the tray means including an upstanding collar member surrounding each tube spaced from the fin outer edges and extending axially of said tube, the tray means extending radially outwardly from the tubes and contacting the shell, shell inlet means including manifold means surrounding the shell, said shell having a series of circumferentially spaced apertures formed therein communicating between the manifold means and tray means, a shell outlet communicating with the shell adjacent the lower ends of said tubes, a vapor outlet communicating with the shell at the upper ends of said tubes, weir means formed in each of the collar members having liquid directing portions radially aligned with each of the fin outer edges for flowing liquids supplied to the tray means through said shell inlet means substantially uniformly onto the outer edges and surfaces of the fins with said weir means constituting the sole means for flowing liquids to said fins and tubes, and gases released from the liquids being free of radial restriction by the fins; whereby as the liquid film flows downwardly along the outer surfaces of the fins and tubes to the shell outlet, gases absorbed therein are vaporized and released from the liquid film, and the vapor passes upward through the shell to the vapor outlet.

4. Gas stripping apparatus including a vertical heat exchanger shell, a tube sheet at one end of the shell, a head member connected to the tube sheet, vertically arranged heat exchanger tubes connected with the tube sheet and extending upwardly in the shell, each tube having a series of longitudinally extending radially projecting spaced fins mounted on an outer surface thereof, said fins having spaced outer edges, means for circulating a heating medium through the head member and the interior of the tubes, tray means within the shell surrounding upper portions of the tubes intermediate the ends of the fins, the tray means including an upstanding collar member surrounding each tube spaced from the fin outer edges and extending axially of said tube, said collar members having upper extremities, shell inlet means communicating with said tray means, a shell outlet communicating with the shell adjacent the lower ends of said tubes, a vapor outlet communicating with the shell at the upper ends of said tubes, the upper extremities of the collar members having saw-tooth-like formations formed therein having V-shaped valleys, the point of each V-shaped valley being located in radial alignment with a tube fin outer edge for flowing liquids supplied to the tray means through said shell inlet means substantially uniformly onto the outer edges and surfaces of the fins with said saw-tooth-like formations constituting the sole means for flowing liquids to said fins and tubes, and gases released from the liquids being free of radial restriction by the fins; whereby as the liquid film flows downwardly along the outer surfaces of the fins and tubes to the shell outlet, gases absorbed therein are vaporized and released from the liquid film, and the vapor passes upward through the shell to the vapor outlet.

5. Gas stripping apparatus including a vertical heat exchanger shell, a tube sheet at one end of the shell, a head member connected to the tube sheet, vertically arranged heat exchanger tubes connected with the tube sheet and extending upwardly in the shell, each tube having a series of longitudinally extending radially projecting spaced fins mounted on an outer surface thereof, said fins having spaced outer edges, means for circulating a heating medium through the head member and the interior of the tubes, tray means within the shell surrounding upper portions of the tubes intermediate the ends of the fins, the tray means including an upstanding collar member surrounding each tube spaced from the fin outer edges and extending axially of said tube, tube support members within the shell maintaining the vertically arranged heat exchanger tubes in predetermined spaced relation, said tube support members being vertically spaced from the tube sheet and tray means, vertically extending tie rods tensioned between at least one of the support members and the tube sheet maintaining the support members and tray means and tube sheet properly assembled, spacer sleeves surrounding the tie rods compressed between the support members and tray means and tube sheet for maintaining said members and means and sheet in proper spaced relation, shell inlet means communicating with said tray means, a shell outlet communicating with the shell adjacent the lower ends of said tubes, a vapor outlet communicating with the shell at the upper ends of said tubes, weir means formed in each of the collar members having liquid directing portions radially aligned with each of the fin outer edges for flowing liquids supplied to the tray means through said shell inlet means substantially uniformly onto the outer edges and surfaces of the fins with said weir means constituting the sole means for flowing liquids to said fins and tubes, and gases released from the liquids being free of radial restriction by the fins; whereby as the liquid film flows downwardly along the outer surfaces of the fins and tubes to the shell outlet, gases absorbed therein are vaporized and released from the liquid film, and the vapor passes upward through the shell to the vapor outlet.

References Cited in the file of this patent

UNITED STATES PATENTS

| | | |
|---|---|---|
| 2,152,266 | McNeal | Mar. 28, 1939 |
| 2,545,651 | Cummings | Mar. 20, 1951 |
| 2,589,262 | Keith | Mar. 18, 1952 |
| 2,649,285 | Brown | Aug. 18, 1953 |
| 2,751,199 | Williams | June 19, 1956 |

FOREIGN PATENTS

| | | |
|---|---|---|
| 279,526 | Great Britain | Oct. 31, 1927 |
| 588,214 | Great Britain | May 16, 1947 |